Dec. 23, 1924.  J. D. CARR ET AL  1,520,173
PUMP PLUNGER
Filed Aug. 7, 1923
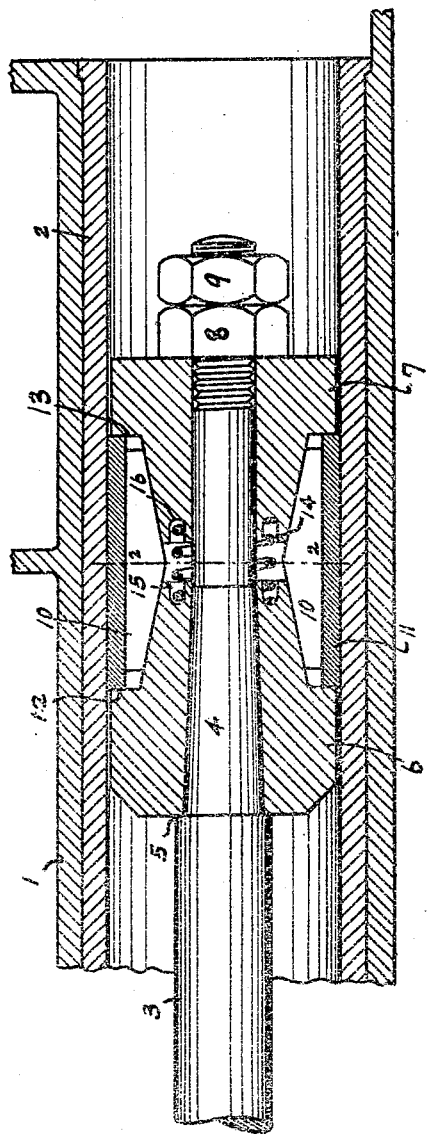
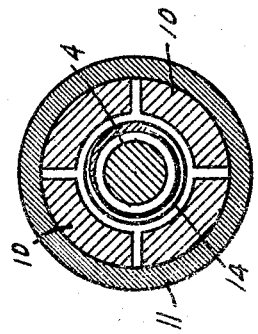
Inventors
John D Carr
John F Ritch
By Hardway & Cathy Attorneys Patented Dec. 23, 1924.

1,520,173

UNITED STATES PATENT OFFICE.

JOHN D. CARR AND JOHN F. RITCH, OF HUMBLE, TEXAS.

PUMP PLUNGER.

Application filed August 7, 1923. Serial No. 656,177.

*To all whom it may concern:*

Be it known that we, JOHN D. CARR and JOHN F. RITCH, citizens of the United States, residing at Humble, in the county of Harris and State of Texas, have invented certain new and useful Improvements in a Pump Plunger, of which the following is a specification.

This invention relates to new and useful improvements in a pump plunger.

One object of the invention is to provide a pump plunger specially adapted for use in a slush pump, and which may be easily adjusted so as to fit snugly in the pump cylinder at all times. In the operation of a pump of the character referred to, the fluid being pumped is laden with sand and grit, and the plunger quickly wears away, and must either be removed and repaired and replaced, or provision must be made to take up the wear so that the plunger will fit closely in the cylinder to prevent leakage past it. The plunger herein described is so constructed that it may be easily enlarged to take up the wear, so as always to form a proper fit in the cylinder.

Another object of the invention is to provide a plunger of the character described which may be adjusted to meet the requirements of the situation.

A still further object of the invention is to provide a pump plunger of the character described formed of two sections with an intervening expansible bushing surrounded by an expansible sleeve, and having also a yieldable member between the plunger sections which will hold said sections at a fixed distance apart during the operation of the plunger, and will not yield to said pressure so that said surrounding bushing will not be expanded by the fluid pressure against the plunger during the forward or back stroke of the plunger, said yieldable member, however, being capable of compression when it is desired to manually adjust said plunger sections toward each other, the plunger herein described, in this respect, constituting an improvement over the one described in our application filed July 30, 1923, under Serial No. 648,641.

With the above and other objects in view this invention has particular relation to certain novel features of construction, operation, and arrangement of parts, an example of which is given in this specification, and illustrated in the accompanying drawings, wherein:—

Figure 1 is a longitudinal sectional view of a pump cylinder, with the plunger therein, and, Figure 2 is a cross sectional view of the plunger taken on the line 2—2 of Figure 1.

In the drawings, the numeral 1 designates the water box, of the pump, and the numeral 2 designates the pump cylinder. The numeral 3 designates the plunger rod whose inner end 4 is reduced forming the shoulder 5, and is tapered toward the free end, said end being outwardly threaded.

The plunger embodies two sections, 6 and 7, having central bearings to receive the reduced tapered end 4 of the plunger rod. The adjacent ends of these sections are spaced apart, and tapered toward each other, and the other ends of said sections abut against the shoulder 5, and the nut 8, respectively. This nut is threaded onto the free end of the plunger rod and is locked thereon by the lock nut 9.

The plunger also embodies an expansible bushing, preferably formed of sections, as 10, and a packing sleeve 11 surrounding said bushing. As stated, the facing ends of the plunger sections are tapered toward each other. They are also reduced, forming the annular shoulders 12 and 13, respectively. The bushing is preferably formed of metallic sections, whose inner faces are formed to conform to the shape of, and fit into, the tapered ends of the plunger sections, and the ends of the bushings are spaced from the corresponding shoulders 12 and 13.

The sleeve 11, surrounding the bushing, is preferably formed of rubber or other suitable packing material, and it is confined against endwise movement by the shoulders 12 and 13. As this sleeve wears away it may be easily expanded, from time to time, by tightening up on the nut 8, thus forcing the plunger sections toward each other and thus expanding the bushing and the packing sleeve surrounding the same until the proper fit of the plunger in the cylinder is obtained, and the lock nut 9 may then be screwed up against the nut 8 to secure the adjustment. The plunger may thus be used until the packing is completely worn away, and then renewed by merely replacing the worn out packing sleeve with a new one.

Upon a forward or power stroke of the plunger, the pressure against the fluid will tend to force the plunger section, operating against the fluid, toward the other section, and thus expand the sleeve 11. This may cause the plunger to fit too tightly in the cylinder, causing unnecessary friction, and wear, for the purpose of avoiding this, a yieldable member has been interposed, between said sections 6 and 7. This yieldable member is preferably in the form of a strong coil spring 14, which surrounds the plunger rod 4, and whose respective ends are seated in the annular grooves 15 and 16, provided in the inner ends of the plunger sections. This spring is of sufficient strength to hold the sections a fixed distance apart during normal operation of the pump, but will yield when the nut 8 is screwed up to adjust said sections toward each other, and when the spring is completely compressed it will permit the inner ends of the plunger to abut said spring then being confined entirely in said grooves.

What we claim is:

The combination with a plunger rod, one end of which is reduced forming an annular shoulder, and tapered beyond said shoulder and formed with external threads on the free end of the reduced portion, of a plunger including two sections having central bearings to receive said reduced end, the outer end of one of said sections abutting against said shoulder, and the adjacent ends of said sections being spaced apart, and tapered toward each other, a nut threaded onto the threaded end of said rod, the tapered ends of said sections being reduced forming annular shoulders, a yieldable member surrounding said rod and interposed between said sections, a bushing formed of metallic sections, whose inner sides are formed to conform to the shape of and fit against the tapered ends of the plunger sections, the ends of said bushing being spaced from the shoulders of said sections, and a sleeve surrounding said bushing formed of packing material and whose ends abut against the respective shoulders of the plunger sections.

In testimony whereof we have signed our names to this specification in the presence of two subscribing witnesses.

JOHN D. CARR.
JOHN F. RITCH.

Witnesses:
E. BEAUMONT,
P. R. HELD.